United States Patent [19]

Marder et al.

[11] Patent Number: 5,716,467

[45] Date of Patent: Feb. 10, 1998

[54] BERYLLIUM-CONTAINING ALLOYS OF ALUMINUM AND SEMI-SOLID PROCESSING OF SUCH ALLOYS

[75] Inventors: James M. Marder, Shaker Heights; Warren J. Haws, Cleveland, both of Ohio

[73] Assignee: Brush Wellman Inc., Cleveland, Ohio

[21] Appl. No.: 328,874

[22] Filed: Oct. 25, 1994

Related U.S. Application Data

[60] Division of Ser. No. 221,374, Mar. 31, 1994, which is a continuation-in-part of Ser. No. 156,356, Nov. 23, 1993, abandoned, which is a continuation of Ser. No. 770,187, Oct. 2, 1991, abandoned.

[51] Int. Cl.⁶ .................. C22F 1/04; B22F 1/00
[52] U.S. Cl. .............. 748/549; 75/249; 75/250; 148/514; 164/477; 164/57.1; 164/80; 164/113; 164/120; 164/900; 420/590
[58] Field of Search ............... 164/477, 57.1, 164/80, 113, 120, 900; 420/590; 75/249, 250; 148/514, 549

[56] References Cited

U.S. PATENT DOCUMENTS

| | | | |
|---|---|---|---|
| 2,399,104 | 4/1946 | Cooper | 420/528 |
| 3,664,889 | 5/1972 | McCarthy et al. | 75/249 |
| 4,229,210 | 10/1980 | Winter et al. | 164/468 |
| 4,434,837 | 3/1984 | Winter et al. | 164/468 |
| 4,482,012 | 11/1994 | Young et al. | 165/146 |
| 4,694,881 | 9/1987 | Busk | 164/113 |
| 4,694,882 | 9/1987 | Busk | 164/113 |
| 4,771,818 | 9/1988 | Kenney | 164/71.1 |
| 5,040,589 | 8/1991 | Bradley et al. | 164/113 |
| 5,260,847 | 11/1993 | Basehore et al. | 360/106 |

FOREIGN PATENT DOCUMENTS 524882  8/1940  United Kingdom .

OTHER PUBLICATIONS

Murray, et al., "Phase Diagrams of Binary Beryllium Alloys", p. 9; 1987.

Murray et al., *Phase Diagrams of Binary Beryllium Alloys*, p. 9, 1987.

Boyer, et al., *Aluminum Alloys*, Metals Handbook Desk Edition, 1985, pp. 6–24, 6–25 and 6–55.

Brown, A.S., *Beating Swords into Golf Clubs*, Aerospace America, Nov. 1993, pp. 18–22.

Kenney, et al., *Semisolid Metal Casting and Forging*, Metals Handbook, 9th Ed., 1988, vol. 15, pp. 327–338.

Flemings, M.C., *Behavior of Metal Alloys in the Semisolid State*, Metallurgical Transactions, 1991, vol. 22A, pp. 957–981.

Marder, et al., *P/M Lightweight Metals*, Metals Handbook, 9th Ed., 1984, vol. 7, pp. 755–763.

*Primary Examiner*—David A. Simmons
*Assistant Examiner*—Robert R. Koehler
*Attorney, Agent, or Firm*—Hopgood, Calimafde, Kalil & Judlowe

[57] ABSTRACT

Disclosed is a practical aluminum based alloy containing 1 to 99 weight percent beryllium, and improved methods of semi-solid processing of aluminum alloys containing beryllium. The present methods avoid molten beryllium, agitation of molten aluminum-beryllium alloys and the need for introducing shear forces by utilizing atomized or ground particles of beryllium mixed with solid, particulate or liquidus aluminum.

2 Claims, 4 Drawing Sheets

BERYLLIUM-CONTAINING ALLOYS OF ALUMINUM AND SEMI-SOLID PROCESSING OF SUCH ALLOYS

This is a divisional of application Ser. No. 08/221,374 filed Mar. 31, 1994 now allowed, which is a continuation-in-part of application Ser. No. 08/156,356 filed Nov. 23, 1993, now abandoned, which is a continuation of application Ser. No. 07/770,187 filed Oct. 2, 1991 now abandoned.

BACKGROUND OF THE INVENTION

1. Field of Invention

The present invention relates to alloys of beryllium and aluminum. More particularly, the invention describes a method for making alloys of aluminum containing beryllium and forming them into useful structural products.

2. Brief Description of the Prior Art

Alloys of aluminum and beryllium are known in the art. For example, Cooper U.S. Pat. No. 1,254,987 describes the addition of aluminum to beryllium for improving machinability. Fenn U.S. Pat. No. 3,337,334 discloses and claims the Lockalloy commercial product (developed by Lockheed and Berylco in the 1960's) which comprises aluminum base metal and 62 weight percent beryllium.

Lockalloy was produced in sheet form and incorporated into the ventral fin of the YF12 experimental aircraft (Duba, *YF-12 Lockalloy Ventral Fin Program*, Final Report, NASA CR-144971, 1976). Following the introduction of Lockalloy, extensive data was obtained on rolled alloys made from pre-alloyed aluminum having 62 weight percent beryllium. See, for example, London, *Alloys and Composites*, Beryllium Science and Technology, Volume 2, Plenum Press, New York (1979).

Second and third order elemental additions to aluminum-beryllium alloys are reported in the literature. They include additions of magnesium, silicon, nickel or silver for making ternary and quaternary alloys of aluminum and beryllium as described in McCarthy U.S. Pat. No. 3,664,889. These alloys are made from rapidly solidified alloy powder, consolidated and worked by conventional means. Russian work on ternary and higher order aluminum-beryllium alloys is variously described in Molchanova, *Phase Equilibria in the Al-Be-Ni System at 600 Deg. C*, Vest. Mosk. Univ. Khim., Vol. 27(3), pages 266–271 (1986); Komarov, *Increasing the Strength of Welded Joints in an Al-Be-Mg Alloy by Heat Treatment*, Weld. Prod., Vol. 26(1), pages 32–33 (1979); Kolachev, *Constructional Alloys of Aluminum Beryllium and Magnesium*, Metalloved. Term. Obrab. Metal. Vol. 13, pages 196–249 (1980); Nagorskaya, *Crystallization in Al-Be-Mg-Zn Quaternary System Alloys*, Metalloved. Term. Obrab. Metal., Vol. 9, pages 72–74 (1973).

Minor amounts of beryllium are typically added to aluminum-rich alloys to prevent oxidation of the aluminum and other alloy components during processing steps like melting and pouring. As a primary example, Brush Wellman Inc., Elmore, Ohio produces and distributes aluminum-rich master alloys containing 10 percent or less beryllium for further processing by bulk producers. The residual beryllium level in downstream aluminum product is preferably less than 0.01 percent.

The most current aluminum-beryllium phase diagram shows a simple eutectic with essentially no terminal, solid solubility at either end. This Al-Be phase diagram, adopted from Murray, *The Aluminum-Beryllium System*, Phase Diagrams of Binary Beryllium Alloys, ASM International Monographs on Alloy Phase Diagrams, page 9 (1987), is reproduced as FIG. 1 in this specification.

Brush Wellman has conducted extensive research on aluminum alloys containing from about 10 to about 75 weight percent beryllium. See Hashiguchi, *Aluminum Beryllium Alloys for Aerospace Application*, European Space Agency Structural Materials Conference, Amsterdam (March 1992). The research showed that an aluminum alloy of about 62 weight percent beryllium is about 70 volume percent beryllium, and an alloy of 50 weight percent beryllium is about 59 volume percent beryllium. It was also discovered that the density and elastic modulus of alloy compositions in this system follow the Rule of Mixtures, i.e., interpolation of alloy properties is generally possible between the respective properties of pure beryllium and pure aluminum.

Results from studies at Brush Wellman's Elmore facilities have also shown that large cast ingots and fine pre-alloyed atomized powder particles can be produced with microstructures showing a metal composite including beryllium in an aluminum matrix. Presently, Brush Wellman markets these alloys as extrusions and stamped sheet products under the trademark AlBeMet™.

All presently known processes for making aluminum based alloys containing beryllium require a complete melt down of the aluminum and beryllium starting materials. Aluminum and beryllium metal charges are liquified in a chamber lined with a refractory material, under vacuum at a temperature well above 1280° C., the melting point of beryllium. This melt is usually cast into an ingot or atomized with an inert gas into a pre-alloy powder. Because these high temperature metallurgical processes are relatively expensive, they demonstrate a need for lower temperature methods which require less machining to reduce scrapped chip losses.

Brush Wellman has processed AlBeMet™ into useful component parts by two alternative routes. Both processes require vacuum melting of aluminum and beryllium starting materials in a ceramic-lined, refractory crucible at temperatures typically in the range between about 1350° to about 1450° C. In the first alternative, the liquified aluminum-beryllium melt is poured through a refractory nozzle to produce a stream which is intercepted by high velocity jets of an inert gas. The jets of gas break the liquid stream into tiny grains which solidify into a pre-alloy powder. Individual grains that comprise the powder pre-alloy have very fine dendritic micro-structure consisting of a beryllium phase within an aluminum alloy matrix. The pre-alloy powder is then consolidated by cold isostatic pressing, hot isostatic pressing or extrusion to produce a gross shape which can then be machined into a useful article.

The second alternative for processing AlBeMet™ into component parts is a conventional ingot casting operation in which molten aluminum-beryllium is poured into a graphite mold cavity and cooled to a solid ingot up to six inches in diameter. The microstructure of this casting is a relatively coarse, dendritic beryllium phase within an aluminum alloy matrix. The casting surface and hot-top are removed and scrapped and the ingot is further processed by rolling, extrusion or machining into the final article shape.

These alternatives are relatively expensive and cheaper net shaping processes are preferable. Conventional semi-solid processing or thixo-forming of metals takes advantage of low apparent viscosities obtained through continuous and vigorous stirring of heat-liquified metals during cooling. These techniques are generally described by Brown, *Net-*

*Shape Forming Via Semi-Solid Processing*, Advanced Materials & Processes, pages 327–338 (January 1993). Various terms are presently used to describe semi-solid processing of metals to form useful articles of commerce, including rheocasting, slurry-casting, thixo-forging and semi-solid forging. Each of these terms is associated with variations in the steps during semi-solid processing or in the types of equipment employed.

Semi-solid processing is initiated by heating a metal or metals above their liquidus temperatures to form molten metal or alloy. Various methods known in the art are used to introduce shear forces to the liquified metals during slow cooling to form, in situ, equiaxed particles dispersed in the melt. Under these conditions, the metals are said to be in a "thixotropic" or semi-solid slurry state. Thixotropic slurries are characterized by non-dendritic microstructure and can be handled with relative ease by mass production equipment allowing process automation and precision controls while increasing productivity of cast materials. See Kenney, *Semisolid Metal Casting and Forging*, Metals Handbook, 9th Ed., Vol. 15, pages 327–338 (1988).

The non-dendritic microstructure of semi-solid metal slurries is described in Flemings U.S. Pat. No. 3,902,544 which represents the state of this art. The described method concentrates on vigorous convection during slow cooling to achieve the equiaxed particle dispersion leading to non-dendritic microstructure. See also, Flemings, *Behavior of Metal Alloys in the Semisolid State*, Metallurgical Transactions, Vol. 22A, pages 957–981 (1991).

Published literature prior to this disclosure has focused on the magnitude of force required to deform and fragment dendritic growth structures using high temperature shearing. It was discovered that semi-solid alloys displayed viscosities that rose to several hundreds, even thousands, of poise depending on shear rates (Kenney, *Semisolid Metal Casting and Forging*, Metals Handbook, 9th Ed., Vol. 15, page 327 (1988)), and that the viscosity of a semi-solid slurry, measured during continuous cooling, was a strong function of applied shear forces—with measured viscosities decreasing as shear rate increased. Flemings, *Behavior of Metal Alloys in the Semi-Solid State*, ASM News, pages 4–5 (Sept. 1991).

Subsequent commercial processes focused on developing different ways to agitate liquified metals to achieve the roughly spherical or fine-grained microstructure in semi-solid slurry. Two general approaches have been developed—(1) rheo-casting, in which a slurry is produced in a separate mixer and delivered to a mold and (2) semi-solid forging, in which a billet is cast in a mold equipped with a mixer which creates the spherical microstructure directly within the mold.

Winter U.S. Pat. No. 4,229,210 discloses a method for inducing turbulent motion when cooling metals with electrodynamic forces in a separate mixer; while Winter U.S. Pat. Nos. 4,434,837 and 4,457,355 disclose a mold equipped with a magneto-hydrodynamic stirrer.

Various methods for agitating or stirring have been developed to introduce shear forces in the cooling metals to form semi-solid slurry. For example, Young U.S. Pat. No. 4,482,012, Dantzig U.S. Pat. No. 4,607,682 and Ashok U.S. Pat. No. 4,642,146 describe means for electromagnetic agitation to produce the necessary shear forces within liquified metals. Mechanical stirring to produce shear rates are also described in Kenney U.S. Pat. No. 4,771,818, Gabathuler U.S. Pat. No. 5,186,236 and Collot U.S. Pat. No. 4,510,987.

Application of currently known semi-solid processing technology to alloys of aluminum containing beryllium is difficult because the dendritic structures present in prealloyed materials require extremely high temperature thixotropic processing under negative vacuum pressure. These high temperatures must exceed the melting point of beryllium (1280° C.). The present specification describes solutions to the stated problems for making alloys of aluminum containing beryllium and further discloses an improvement in semi-solid processing for metal alloys.

OBJECTS OF THE INVENTION

It is an object of the present invention to provide practical aluminum-based alloys with beryllium additions in the range of 1 to 99 weight percent by modified semi-solid processing.

It is also an object of the present invention to provide practical aluminum-based alloys with beryllium additions, preferably in the range of 5 to 80 weight percent by modified semi-solid processing.

It is another object to provide a method for semi-solid processing which does not require heating to extremely high liquidus temperatures necessary for certain metals such as beryllium.

Another object is to provide a method for near net shape processing of aluminum-beryllium alloys which does not require high temperature vacuum melting.

A further object is to provide a method for near net shape processing of aluminum-beryllium alloys using non-reactive gas blanketing at low temperatures to protect the beryllium phase from oxidation.

It is another object to provide a method for semi-solid processing which does not require introduction of shear forces.

Another object of the present invention is to provide a modified semi-solid process for aluminum alloys using 5 to 80 weight percent powdered beryllium which eliminates the need for fully liquid metal processing.

It is yet another object to provide a method by which precision net shape aluminum components can be formed with significant amounts of beryllium.

A further object is to provide a technique for producing precision parts of aluminum-based alloys containing beryllium in the range between 5 to 80 weight percent.

Other objects of the present invention will become apparent to those skilled in the art after a review of the following disclosure.

SUMMARY OF THE INVENTION

The present invention includes methods which provide practical alloys of aluminum containing beryllium and means for making net shape aluminum-beryllium components which contain significant amounts of beryllium. The term "net shape" as used in this specification describes a component which is very near its final form, i.e., a precision casting that requires very little further machining before end-use application.

This disclosure also describes a novel use of solid beryllium particles dispersed in liquid or powder aluminum to produce beryllium-containing alloys of aluminum for semi-solid processing. The presently claimed alloys (and corresponding parts) have densities lower than other known aluminum alloys and a modulus of elasticity nearing that of beryllium. The modulus increases with beryllium content and approaches a linear combination when the amount of aluminum is 10.0 million psi and the amount of beryllium is 44 million psi.

The present alloys can be made by conventional ingot metallurgy or known atomization techniques. But, the presently described method more conveniently allows for combining aluminum, in either liquid or solid form, with solid particulate beryllium at dramatically lower temperatures. This addition of solid beryllium particles to produce the required mixture and proper dispersion in liquid or powder aluminum at the specified low temperatures, is uniquely described and claimed in the present disclosure. The following table summarizes the properties of the various beryllium-containing aluminum alloys made according to the present invention.

TABLE I

Beryllium-Containing Aluminum Alloy Property Comparison

| Be (Wt %) | Density (lb/in$^3$) | Modulus (MSI) | E/Rho (in × 10$^6$) | CTE (in/in/°F. × 10$^{-6}$) |
|---|---|---|---|---|
| 0 | 0.097 | 10.0 | 102.6 | 13.1 |
| 5 | 0.095 | 12.4 | 130.5 | 12.6 |
| 10 | 0.093 | 14.7 | 158.3 | 12.2 |
| 15 | 0.091 | 17.0 | 186.2 | 11.7 |
| 20 | 0.089 | 19.1 | 214.0 | 11.3 |
| 25 | 0.087 | 21.1 | 241.9 | 10.9 |
| 30 | 0.086 | 23.1 | 269.7 | 10.5 |
| 35 | 0.084 | 25.0 | 297.6 | 10.2 |
| 40 | 0.082 | 26.8 | 325.4 | 9.8 |
| 45 | 0.081 | 28.5 | 353.3 | 9.5 |
| 50 | 0.079 | 30.2 | 381.1 | 9.1 |
| 62 | 0.076 | 33.9 | 448.0 | 8.4 |
| 70 | 0.074 | 36.3 | 492.5 | 7.9 |
| 80 | 0.071 | 39.0 | 548.2 | 7.4 |
| 90 | 0.069 | 41.6 | 603.9 | 6.9 |
| 100 | 0.067 | 44.0 | 659.7 | 6.4 |

Since the starting material is a mixture of two powders, and there is no apparent tendency for the two powders to separate during the process, alloy compositions from 1 to 99 weight percent beryllium, balance aluminum, are made pursuant to the present method.

The commercial market requires aluminum based alloys with higher elastic modulus and lower density. As indicated in Table I, a continuous variation of properties from those of the aluminum alloy at one extreme to beryllium at the other is achieved. For example, a 5 percent beryllium increment produces a 25 percent higher modulus at about the same density when compared to the aluminum alloy base.

In one embodiment, spherical beryllium powder, produced preferably through an atomization process from liquid beryllium, is mixed with aluminum in powder, chip or other coarsely divided form. Inert gas atomization, a technique well known to those skilled in the art, was employed in some of the following examples to make the spherical beryllium powder. The use of atomized beryllium is preferred in the presently disclosed semi-solid processing because the spherical shaped particles improve flow during shaping and also cause less erosion to the surfaces of the equipment used.

Other methods for making beryllium powder are described in Stonehouse, *Distribution of Impurity Phases*, Beryllium Science & Tech., Vol. 1, pages 182–184 (1979) which is incorporated by reference herein. Ground beryllium is also applicable in conjunction with, or as an alternative to, spherical beryllium powder. Ground beryllium is ordinarily produced through impact grinding such as the Coldstream process, well known by those skilled in the art. These and other standard methods of comminuting beryllium powder are available in the art. See Marder, *P/M Lightweight Metals*, Metals Handbook, 9th Ed., Vol. 7, pages 755–763 (1984); Stonehouse, *Beryllium*, ASM International Metals Handbook, 10th Ed., Vol. 2, pages 683–687 (1990) and Ferrera, *Rocky Flats Beryllium Powder Production*, United Kingdom Atomic Energy Authority Memorandum, Vol. 2, JOWOG 22/M20 (1984) which are incorporated by reference herein. In all cases, the beryllium starting material was provided by Brush Wellman.

Commercial purity aluminum and aluminum alloy powders are available from Valimet Co., Stockton, Calif. Specific aluminum-based alloys suitable for processing by the present method include American Society for Metals Aluminum Alloy Nos. 1100, 1300, 2024, 5056, 6061, A356 and A357, the compositions of which are tabulated in Boyer-Gail, *Aluminum Alloys*, ASM International Metals Handbook, 1985 Desk Edition, Table 2, pages 6–24 and 6–25, and Table 3, page 6–55, which pages are all incorporated by reference herein.

In the preferred embodiment, a mixture of spherical beryllium powder and chipped solid aluminum is heated to a temperature at which only the aluminum components melt (typically above 640° C.). This results in a suspension of beryllium particles in liquid aluminum. A semi-solid slurry of aluminum and beryllium is obtained without elevation to extreme temperature, and non-dendritic beryllium phase microstructure is achieved without introducing external shear forces into molten liquid metal. This process can be successfully conducted under a protective atmosphere, typically a vacuum environment or non-reactive gas such as argon, nitrogen or helium.

FIG. 2 is a photomicrograph showing the desirable, non-dendritic structure of an aluminum-beryllium alloy made by vacuum hot pressing aluminum alloy powder and equiaxed beryllium powder at about 704° C. Alloys having the structure shown in FIG. 2 are useful for direct engineering applications which require solidification in place to make a component part. They can also be subjected to conventional metal working processes, including subsequent rolling, forging or extruding.

Alloys having the structure illustrated in FIG. 2 can also serve as precursors for semi-solid processing to produce net shape parts. FIG. 3 is a photomicrograph showing preferred structure after modified semi-solid processing of an aluminum-beryllium alloy. The FIG. 3 microstructure is similar to that shown in FIG. 2. This modified semi-solid process did not involve the introduction of any shear forces prior to solidification. Thixotropic mixtures with structures similar to those illustrated in FIG. 3 are injected or molded using suitably modified extrusion or die-casting equipment. These processes are typically carried out in devices similar to those used for injection molding of plastic.

Conventional semi-solid processing is divided into two major operations—(1) the raw material preparation step needed to develop the initial microstructure and (2) the semi-solid shaping step. Unlike known semi-solid processing, the presently disclosed method does not require the raw material preparation step because the proper microstructure is immediately and automatically achieved by starting with two powder components heated above the solidus temperature of only one component.

There is little terminal solubility of the beryllium in the aluminum, or aluminum in beryllium. Therefore, the processing temperature of the material to be thixotropically formed by the presently claimed semi-solid process remains less than the liquidus temperature of the aluminum-beryllium alloy. This permits use of equipment made with less complex and relatively inexpensive engineering materials which do not need to withstand the extreme temperatures necessary to melt beryllium (above 1280° C.). Selected processing temperatures are dependent on the volume fraction of solid materials in the slurry. The net amount of solid present in slurry is established by the amount of solid beryllium added, plus the solid portion (if any) of the partially molten aluminum component. These innovative concepts allow for net-shape semi-solid processing of aluminum-beryllium alloys at the low temperatures typical of aluminum products.

There are two generally known approaches to semi-solid shaping—(1) thixotropic forging, where the alloy work piece is shaped by being squeezed in a closed die or flowed by a plunger into a permanent mold cavity and (2) thixotropic casting, where the semi-solid metal is conveyed to a permanent mold cavity by a rotating auger feed stroke. Both of these processes are compatible with the present invention as demonstrated by the examples below.

DETAILED DESCRIPTION OF THE INVENTION

Figure 1:
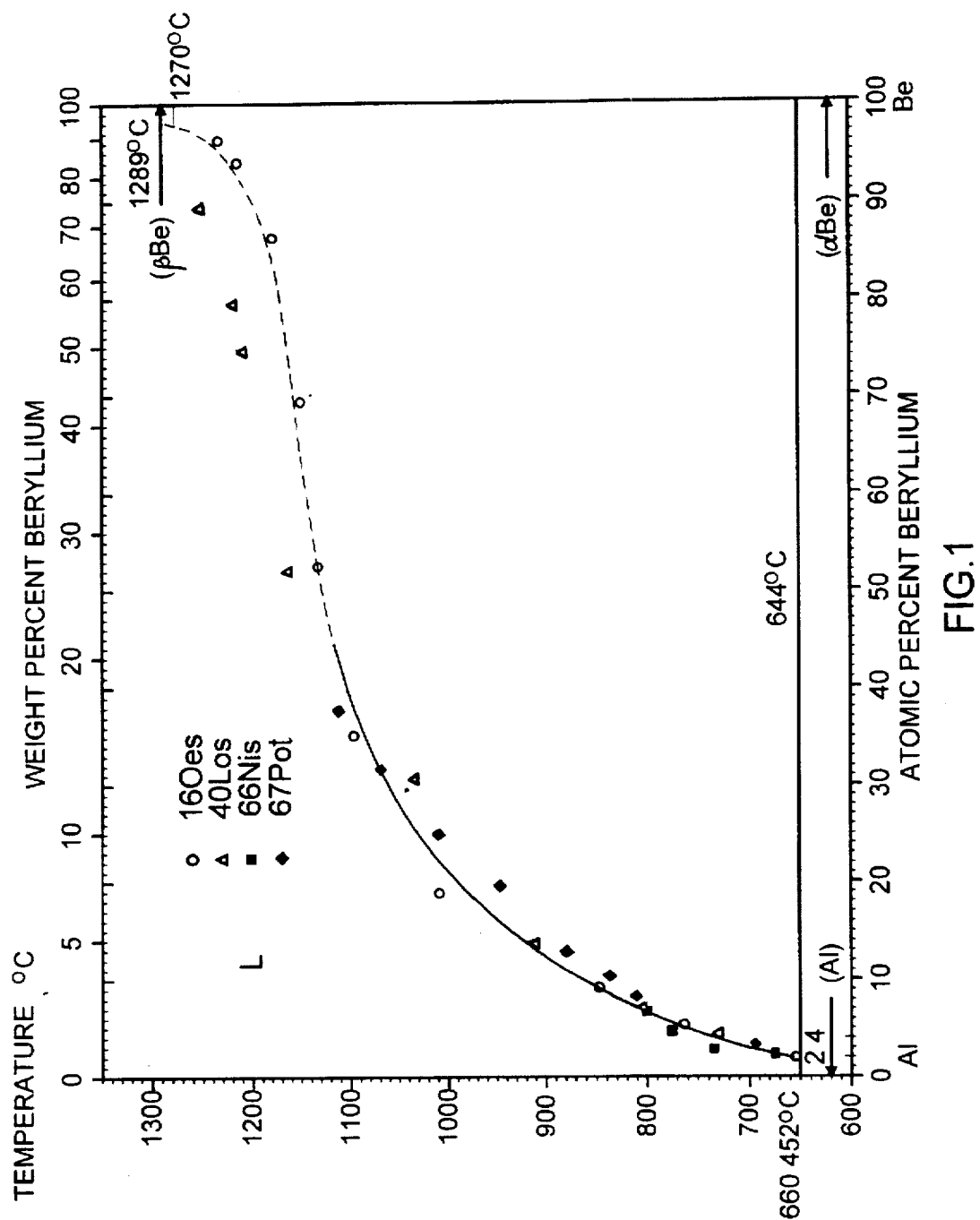
FIG. 1 is a current aluminum-beryllium phase diagram.

The examples below were conducted to produce net shapes of aluminum alloys containing additions of beryllium. These aluminum-beryllium alloys were produced into near net shape from the semi-solid state using in situ freezing or closed die forging. The examples clearly demonstrate that thixotropic forming of an aluminum based alloy with solid beryllium additions is feasible without externally introduced shear forces.

All environmental health and safety equipment, including supplementary HEPAVAC ventilation, are installed prior to the initiation of trials. Air counts are taken periodically during the trials and final clean-up operation. All participants wear suitable air filter masks and clothing during the trials. Further safety details are available from Brush Wellman Inc., Cleveland, Ohio.

Thixomolding is a semi-solid molding process which is generally described in U.S. Pat. Nos. 4,694,881, 4,694,882 and 5,040,589. Each patent is incorporated by reference herein. As stated in the Background section of this specification, the current art requires the addition of shear forces into substantially liquified metals to produce the necessary non-dendritic microstructure. Apparatus associated with the Thixomolding process were modified for the trials reported below, but those Thixomolding steps which require the application of shear forces to liquidus metals for generating non-dendritic microstructure were not practiced.

EXAMPLE 1

Starting Materials for Semi-Solid Process of Al-Be Alloys

Aluminum based alloys other than commercially pure aluminum may be used to provide the molten phase for making the present aluminum-beryllium alloys. They can also be used as a precursor for the modified thixotropic process of the present invention. Alloys of aluminum are chosen based on their compatibility with beryllium. This compatibility is generally characterized as an absence of elements which would form weak, brittle or otherwise deleterious intermetallic compounds with beryllium at the relatively low temperatures used for semi-solid processing.

Several candidate alloys meet this compatibility requirement, including American Society for Metals Aluminum Alloy Nos. 1100, 1300, 2024, 5056, 6061, A356 and A357. See Boyer, *Aluminum Alloys*, ASM Int'l Metals Handbook, Desk Ed., pages 6–24, 6–25 and 6–55 (1985). The compositions of these alloys are presented in Table II.

TABLE II

NOMINAL COMPOSITIONS OF SELECTED ALUMINUM ALLOYS

| Alloy AA No. | Element | | | |
|---|---|---|---|---|
| | Si | Mg | Cu | Cr |
| 1100 | — | — | 0.12 | — |
| 6061 | 0.6 | 1.0 | 0.3 | 0.2 |
| 5056 | — | 5.0 | — | 0.1 |
| 1350 | — | — | — | — |
| A356 | 7.0 | 0.3 | — | — |
| A357 | 7.0 | 0.5 | — | — |

For example, powdered Aluminum Alloy No. 6061 (available from Reynolds Aluminum Co., Louisville, Ky.) is mixed with impact ground, equiaxed beryllium powder provided by Brush Wellman. The resulting mix is then hot isostatically pressed at a temperature above the solidus of Alloy 6061 (about 645° C.), but well below the melting point of beryllium.

The resulting material serves, for example, as an input for the modified Thixomolding process which produces precision parts. The processing temperatures used for this starting material are between 645° and 700° C. so that only the aluminum melts.

As Table II indicates, Aluminum Alloy No. 6061 contains magnesium, copper and chromium, each of which forms a deleterious beryllium intermetallic compound when processed at the high temperatures required in conventional, fully molten processing. Ashurst, *Structure and Properties of I/M AlBe Alloys*, ASM-Sponsored Aeromat, Long Beach, Calif. (May 1991). The relatively low processing temperatures used for obtaining the liquid aluminum-rich phase avoids the formation of deleterious compounds and permits much wider latitude in alloying capability.

EXAMPLE 2

Preparation of Precursors to Conventional Processing

The modified semi-solid processing of the present invention can be used to fabricate precursor materials for additional, conventional metallurgical processes. Powders of aluminum, or an aluminum-based alloy such as Alloy 6061, and beryllium are mixed and vacuum hot pressed in the temperature range above the solidus of the aluminum alloy and below the melting point of the beryllium as noted in Example 1. The product of this semi-solid consolidation step is in the form of a billet for closed-die forging a net shape component.

Open die forging is also used, depending on the economics of the production process. The forging of this component takes place below the solidus temperature of the aluminum alloy, providing a conventionally processed, net shape finished part.

EXAMPLE 3

Preparation of Precursors to Semi-Solid Processing

The modified semi-solid processing of the present invention is also used to fabricate precursor materials for semi-solid processes. Powders of aluminum, or an aluminum-based alloy such as Alloy 6061, and beryllium are mixed and vacuum hot pressed in the temperature range above the solidus of the aluminum alloy and below the melting point of the beryllium as noted in Examples 1 and 2.

This semi-solid consolidation step produces a billet for closed-die forging net-shaped components. These components are preferably forged in the temperature range above the solidus of the aluminum alloy, providing a semi-solid processed, net shape finished part. However, it should be noted that the temperature of this final forging step can be performed above or below the liquidus of the aluminum alloy, to adjust for the total fraction of solid material during the final steps. The total solid fraction is equal to the fraction of beryllium present, in addition to the solid contribution of the aluminum alloy, if any.

EXAMPLE 4

Preparation of Precursor Materials for Closed Die Forging

Figure 2:
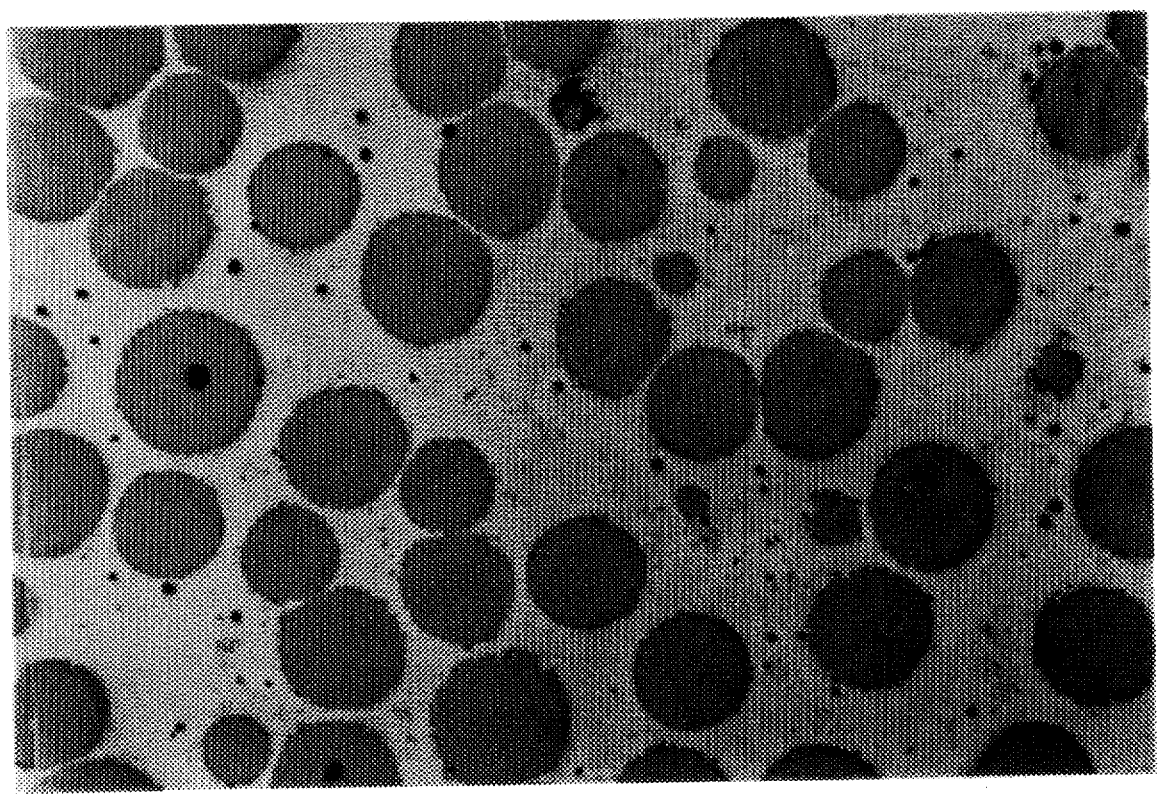
FIG. 2 is a photomicrograph illustrating equiaxed morphology in the beryllium phase of an aluminum-beryllium alloy made according to the present invention.

FIG. 2 is a photomicrograph showing the desirable, non-dendritic structure of an aluminum-beryllium alloy made by vacuum hot pressing aluminum powder and equi-axed beryllium powder at temperatures between 645° C. and 700° C. according to the present invention. The non-dendritic structure was obtained without the need for shear forces, such as stirring, prior to solidification. The structure shown in FIG. 2 is useful for engineering applications which require solidification in place to make a component part. They can also be subjected to conventional metal working processes, including subsequent rolling, forging or extruding.

The non-dendritic microstructure shown in FIG. 2 was obtained in a 40 percent beryllium, aluminum alloy solidified in place after vacuum hot pressing commercially pure aluminum powder and powdered beryllium. The aluminum powder is available from Reynolds Aluminum Co., Louisville, Ky. and powdered beryllium can be obtained from Nuclear Metals Inc., West Concord, Mass.

A powder blend of 60 weight percent of commercially pure aluminum powder (−400 mesh) and 40 weight percent atomized beryllium (−50 mesh) was heated in a vacuum at 704° C., with pressure applied to compact the semi-solid mass. The non-dendritic structure was achieved without introduction of shear forces because the second phase (beryllium) remained solid during the entire process.

Alternatively, the powders can be consolidated at a temperature below the solidus of aluminum, approximately 645° C., so that the aluminum does not melt. The non-dendritic structure obtained by consolidation below the solidus is similar to the microstructure illustrated in FIG. 2. Their alloys were used as precursors for the semi-solid processing as outlined in the next example.

EXAMPLE 5

Closed Die Forging

Figure 3:
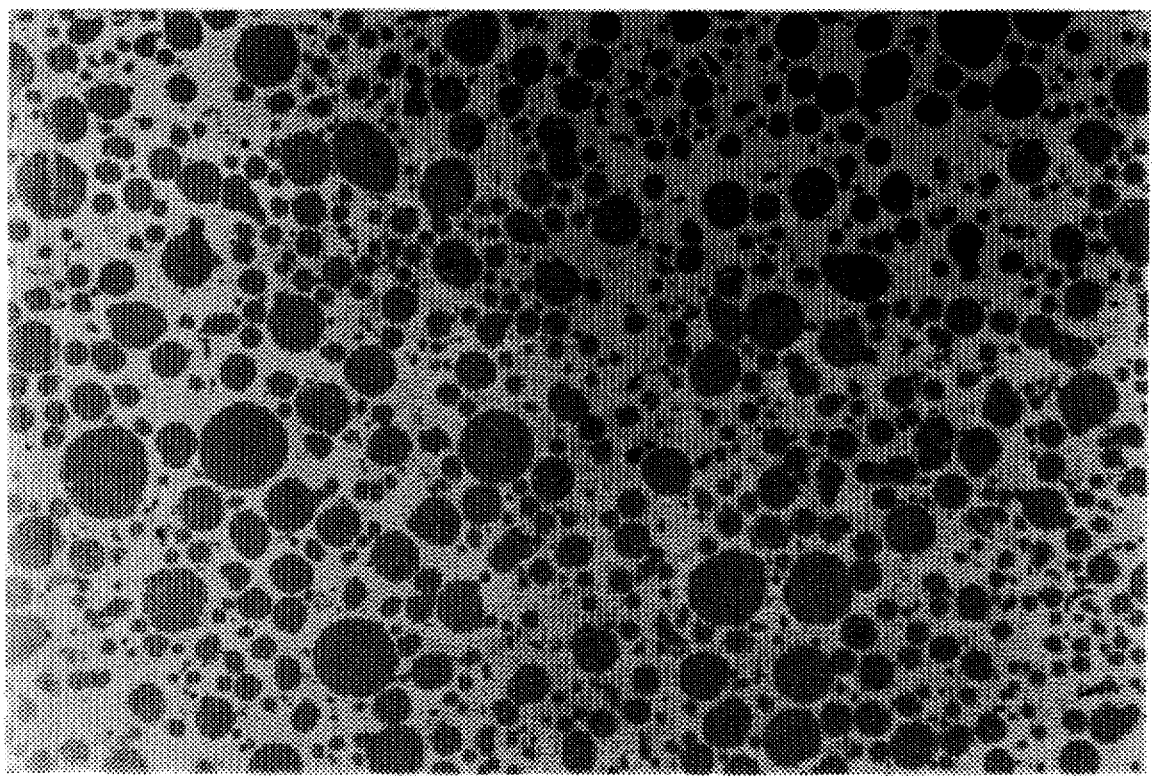
FIG. 3 is a photomicrograph showing retention of the equiaxed beryllium morphology after modified semi-solid processing of an aluminum-beryllium alloy. The structure is similar to that shown in FIG. 2.

The structure illustrated in FIG. 2 can also serve as a precursor for semi-solid processing to produce net shape parts. FIG. 3 is a photomicrograph showing the desirable structure after semi-solid processing of an aluminum-beryllium alloy. This process did not involve any shear processing such as stirring prior to solidification. Thixotropic mixtures with structures similar to those shown in FIG. 3 are injected or molded, using suitably modified extrusion or die-casting equipment. These processes are typically carried out in devices similar to those used for injection molding of plastic.

FIG. 3 shows that even after semi-solid forging, the non-dendritic microstructure is preserved for the aluminum-beryllium alloy made pursuant to the techniques described in Example 4. Like the process of Example 4, the semi-solid forging did not require external shear forces.

Solid Al-Be billets were machined from a precursor made following techniques like those outlined in Example 4. More particularly, the precursor for this example was made by consolidating a blend of 40 weight percent atomized beryllium (−325 mesh) and 60 weight percent commercially pure aluminum powder (−400 mesh) at 621° C., below the aluminum solidus. The atomized beryllium is available from Brush Wellman and pure aluminum powder can be obtained from Reynolds Aluminum Co.

The billets were then heated to the semi-solid region (about 704° C.) in a furnace. Preheated billets were transferred into dies using tongs and injected into closed cavities where they solidified. FIG. 3 illustrates the resulting microstructure after the injection/forging process. The size and shape of the beryllium phase have not altered as a result of the additional processing because the beryllium remains solid during the entire process. Parts containing thin sections are also forged using the method described in this example, but modified with a mold designed for the thin sections.

EXAMPLE 6

Preparation of Precursor Materials By Casting

Equiaxed beryllium was added to molten aluminum using an aluminum flux to prevent oxidation. Additions as high as 40 weight percent beryllium were made to the aluminum melt. The melt was then allowed to solidify in place. A non-dendritic structure was formed without the need for shear forces because the beryllium was added in equiaxed form as a solid and did not change shape.

The structure obtained is useful for engineering applications which require solidification in place to make a component part. They can also be subjected to conventional metal working processes, including subsequent rolling, forging or extruding. The structure obtained can also serve as a precursor for semi-solid processing to produce net shape parts.

EXAMPLE 7

Semi-solid Processing of Aluminum Alloys

This example summarizes how component parts are made using modified semi-solid processing with mixed powders followed by hot isostatic pressing to attain full density and conventional forging to define shape.

Aluminum powder is mixed with 40 weight percent beryllium powder and loaded into a vacuum hot pressing die. Vacuum hot pressing is then carried out at about 650° C. and a pressure of 1000 psi to achieve a density at 95 percent of theoretical (5 percent porosity).

The billet is placed into a hot isostatic press at 15 ksi and about 600° C. to achieve full density. The resulting part is forged at a temperature at which it was fully solid, for example, about 600° C., and machined to final components with properties similar to those listed in Table I.

Parts can also be made by modified semi-solid processing of mixed powders followed by hot isostatic and semi-solid forging to attain full density and define shape. Vacuum hot pressing at about 650° C. and 1000 psi increases density to 95 percent of theoretical (5 percent porosity). The billet is forged in the semi-solid state, at about 704° C. to a near net shape, with properties similar to those provided in Table I.

Pre-forms of aluminum alloy containing beryllium fabricated by vacuum hot pressing, hot isostatic pressing or other powder consolidation methods are further processed in subsequent semi-solid processing operations, including thixotropic forging, thixotropic casting and thixotropic (semi-solid) extrusion.

EXAMPLE 8

Comparative Testing Fully Solid Process

Initially, a combination of elemental aluminum and beryllium was melted and formed into an Al-Be powder which was hot rolled in a fully solid process. In a separate procedure, a beryllium powder and a separately formed aluminum powder were then combined and heat rolled in a fully solid process. For both procedures, elemental Aluminum Alloy No. 1100 was used with 20 weight percent beryllium powder processed by extrusion and subsequent rolling into sheet. Tensile tests were then carried out in the as-rolled and stress relieved conditions. This data compared the properties of pre-alloyed, atomized (as opposed to elementally blended) powder source material in both heat treatment conditions. The results are summarized below in Table III.

TABLE III

TENSILE STRENGTH OF ALUMINUM-BERYLLIUM ALLOYS

| Process | Condition (HT) | Y.S. (KSI) | U.T.S. (KSI) | Elong. (%) | Modulus (MSI) |
|---|---|---|---|---|---|
| Atomized | As-Rolled | 25.5 | 31.3 | 14.8 | 14.8 |
|  | Stress-Relieved | 18.2 | 25.7 | 11.6 | 11.6 |
| Powder Blended | As-Rolled | 18.5 | 20.2 | 3.6 | 11.6 |
|  | Stress-Relieved | 10.0 | 17.9 | 14.9 | — |

The strength of the elemental blended powder sheet was substantially lower than the pre-alloyed, atomized powder sheet. Elastic modulus values of elementally blended material were significantly lower than that of pre-alloyed, atomized material. This demonstrates that, in the absence of a semi-solid processing step, the properties required for this material are not attainable by mixing elemental powders.

This example demonstrates that simply blending aluminum and beryllium powders, followed by consolidation and rolling is insufficient to achieve desirable properties. The modified semi-solid processes of the present invention are required.

EXAMPLE 9

Useful Structural Product

Figure 4:
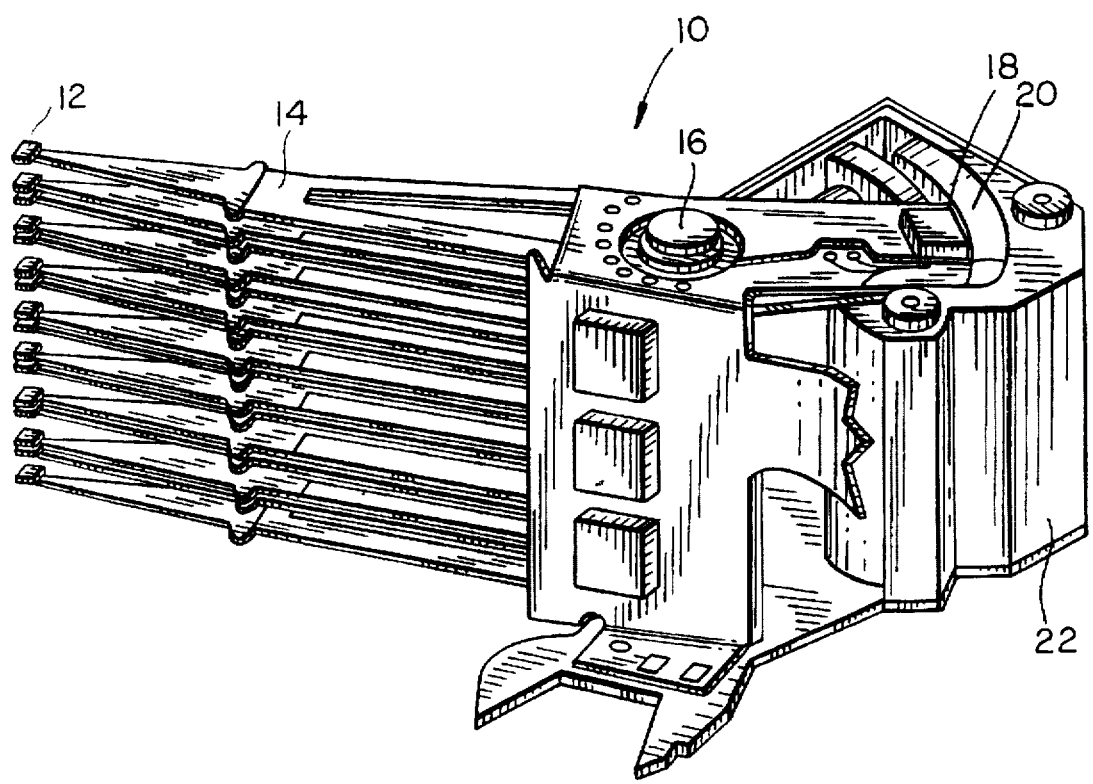
FIG. 4 illustrates an assembly of read/write heads comprised of the presently disclosed aluminum-beryllium alloy.
Figure 5:
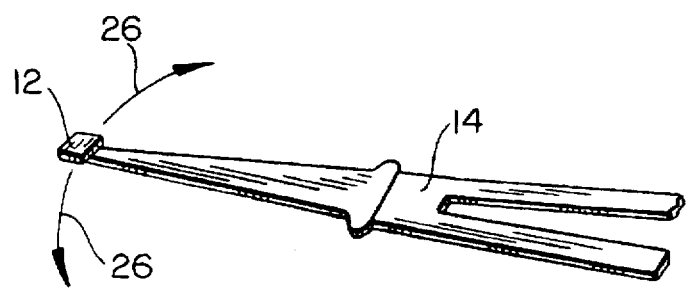
FIG. 5 shows a net shape, single actuator arm from the assembly of FIG. 4. Forces exerted on the arm are represented by vectors.

Non-limiting examples of articles manufactured with the alloys of the present invention can include actuator arms for disk drives, turbine blades, avionics boxes and aircraft skins. FIGS. 4 and 5 show a rotatable armset of an actuator having a bore for rotating about the shaft of a disk drive for positioning a head radially across a disk, wherein the armset is a one piece unit consisting essentially of an alloy of aluminum containing beryllium comprising from about 1 to about 99 weight percent beryllium, with the balance an aluminum component.

In particular, FIG. 4 illustrates a read/write assembly for hard disk drive 10 having multiple heads 12 mounted on actuator arms 14. Heads 12 and actuator arms 14 are assembled together on actuator shaft 16 which is rotated by the interaction of wire coil 18 and magnet 20 disposed in magnet housing 22. Actuator arms 14 are spring loaded to rest on the disk when it is stationary. When the disk is rotated, air pressure develops beneath head 12 and lifts it slightly above the disk.

Actuator arms 14 are subjected to vertical forces 24 and angular forces 26 as shown in FIG. 5. Actuator arms 14 should be sufficiently stiff to minimize the amplitude of vertical vibration and avoid damaging the disks above and below actuator arms 14. Likewise, actuator arms 14 should be sufficiently stiff to minimize the amplitude of lateral vibration and provide a more rapid response time for reading or writing at an appropriate address on the disk. Laminated materials are effective in minimizing deflections, principally in the vertical direction. The equiaxed morphology in the beryllium phase of the aluminum-beryllium alloy made according to the present invention is effective to minimize deflections in both the vertical and lateral directions.

Various modifications and alterations to the present invention may be appreciated based on a review of this disclosure. These changes and additions are intended to be within the scope and spirit of this invention as defined by the following claims.

What is claimed is:

1. A method for making an aluminum alloy containing beryllium comprising the steps of:

(a) providing an aluminum component in powder form and a beryllium component in powder form;

(b) mixing said aluminum and beryllium components;

(c) melting said aluminum component at a temperature above approximately the solidus temperature of aluminum to create a semi-solid slurry of solid beryllium dispersed in liquid aluminum; and (d) in situ casting of the semi-solid slurry.

2. The method of claim 1 further comprising steps selected from the group consisting of closed die forging, semi-solid forging, and semi-solid molding.

* * * * *